United States Patent [19]
Gockel

[11] 4,090,477
[45] May 23, 1978

[54] METHOD OF IMPROVING OPERATION OF INTERNAL COMBUSTION ENGINES

[75] Inventor: Jack L. Gockel, San Diego, Calif.

[73] Assignee: Cragar Industries, Inc., Compton, Calif.

[21] Appl. No.: 720,186

[22] Filed: Sep. 3, 1976

[51] Int. Cl.² .................... F02M 25/06; F02P 5/04
[52] U.S. Cl. .................... 123/1 R; 123/117 A; 123/119 B; 123/117 R
[58] Field of Search ........... 123/117 R, 117 A, 119 R, 123/119 B, 1

[56] References Cited

U.S. PATENT DOCUMENTS

| | | | |
|---|---|---|---|
| 2,778,892 | 1/1957 | Vanderpoel | 123/117 A |
| 3,494,339 | 2/1970 | Fernandez et al. | 123/119 B |
| 3,661,128 | 5/1972 | Eshelmann | 123/119 B |
| 3,906,910 | 9/1975 | Szlaga, Jr. | 123/119 R |
| 3,973,534 | 8/1976 | Amos | 123/119 B |

Primary Examiner—Wendell E. Burns
Attorney, Agent, or Firm—Warren T. Jessup

[57] ABSTRACT

A process and apparatus for improving fuel economy and exhaust emissions of internal combustion engines operating at high altitude conditions. The process is comprised of adjustments to spark timing carburetor idling and crankcase ventilation flow to lean out the fuel-air mixture an amount based on the relative elevation in altitude. The process includes the use or modification of a crankcase ventilation modulating valve having novel flow characteristics and produces much greater efficiency than would be expected under the high altitude conditions. The manifold vacuum between the engine carburetor and piston modulates the valve to provide a greater air flow when increased power is demanded from the engine. In addition to coordinating the spark timing with the modulating valve air flow, the process includes a concomitant special adjustment of the engine's speed and fuel air mixture at idle.

8 Claims, 4 Drawing Figures

METHOD OF IMPROVING OPERATION OF INTERNAL COMBUSTION ENGINES

BACKGROUND

This invention relates to a method for improving fuel economy and emissions in high altitude conditions.

It has long been known that at high altitudes the conventional automobile engine operates at higher ratios of fuel to air, causing increased carbon monoxide exhaust emissions to be emitted and increasing fuel consumption. Tests by laboratories at high altitude conditions have shown that carbon monoxide emissions are more than twice those for the same engine operating at sea level conditions. This has caused severe air pollution problems at relatively high altitude locations such as Denver.

Late-model vehicles are being equipped with oxidizing catalytic converters to further reduce carbon monoxide and unburned hydrocarbons. More than one-half of these vehicles are adjusted to low fuel-air ratios to provide enough oxygen in the exhaust for catalytic conversion. At high altitudes the fuel-air ratio is affected such that the catalytic converters do not function properly, thereby greatly diminishing an important pollution control strategy.

Engines are designed and adjusted to optimize the carburetor fuel-air ratio and spark timing at sea level to provide the lowest fuel consumption commensurate with the exhaust emission standards imposed. This optimum fuel-air ratio is adversely altered by the effect of high altitudes on the carburetor and results in greater fuel consumption which intensifies an already critical energy shortage in the United States.

Additionally, more stringent standards are being imposed in coming years to reduce the carbon monoxide at high altitude conditions. The new standards imposed by this regulation are to correct for the altitude effect on emissions and fuel consumptions. However, these new standards only apply to post 1976 model vehicles which does not alleviate the problem of the many thousands of vehicles operating at high altitudes that will be in service for many years, producing high levels of air pollution with lower fuel economy.

SUMMARY

The purpose of this invention is to provide a method and apparatus for improving economy and exhaust emissions at high altitude conditions for internal combustion engines.

This purpose is accomplished by coordinating spark timing, fuel-air ratio and crankcase ventilation air flow. In order to achieve the greater fuel economy and lowered emissions, the spark timing is advanced and coordinated by modification of a modulating PCV (positive crankcase ventilation) valve to allow for increased air flow. In conjunction with these two modifications the engine idle speed and fuel air mixture are adjusted by means of adjustment of the speed and mixture screws on the engine carburetor. With these adjustments accurately and properly made, according to the method described herein, much greater fuel economy and lowered emissions are achieved than one would reasonably expect.

It is one object of the present invention to provide an engine adjustment and modification method which improves fuel economy under high altitude conditions.

Another object of the present invention is to provide an apparatus for changing engine performance to improve fuel economy.

Still another object of the present invention is to provide an engine adjustment and modification method for internal combustion engine which lowers the emission of air pollutants.

These and other objects, advantages and novel features of the invention will become apparent from the following detailed description of the invention when considered in conjunction with the accompanying drawings.

DETAILED DESCRIPTION OF THE PREFERRED EMBODIMENT

Figure 1:
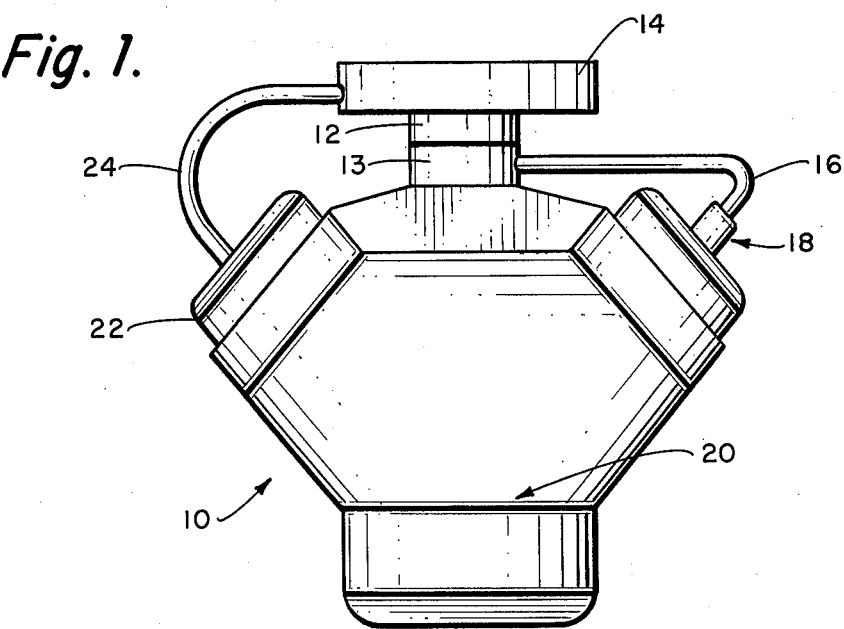
FIG. 1 is a semi-schematic drawing of a typical internal combustion engine.

Referring to FIG. 1 there is shown an engine generally indicated at 10 having a carburetor 12 with an air cleaner 14 mounted in the usual fashion on top of the carburetor. A carburetor 12 is connected by means of a conduit 16 to a modulating or positive crankcase ventilation valve 18 which is connected internally to the crankcase generally indicated at 20. Under certain conditions, gases to the crankcase 20 are also supplied from the air cleaner 14 through conduit 24 connected to head cover 22.

The method of the invention is comprised of adjusting and modifying the internal combustion engine 10 to reduce fuel consumption and exhaust pipe emissions during operation at altitudes above sea level and particularly at high altitudes. This method consists of three adjustments or modifications. The first step involves the adjustment of the engine's spark timing according to a specified particular procedure as follows.

1. Determine the basic spark timing specified by the manufacturer of the particular internal combustion engine.
2. Increase the crank shaft timing position specified by one degree for each thousand feet of elevation above sea level where the engine is to be operated.
3. Adjust the basic spark timing to the advanced crankshaft degrees value determined by the step described in 2 above.

An example of this adjustment would be if the manufacturer specified adjusting the spark to 6° before top dead center (BTDC) then for an altitude of 5000 feet the adjustment would be 11° BTDC arrived at by adding 5° to the specified 6° setting. The engine would be timed by then adjusting the basic spark to ignite at 11° before top dead center (BTDC).

The second step in the method of the invention is to modify the flow through the positive crankcase ventilation system and particularly by modifying the crankcase ventilation valve 18. The positive crankcase ventilation system is provided on engines manufactured in the last decade to reduce the emission of crankcase gases into the atmosphere.

Referring again to FIG. 1, carburetor 12 creates a vacuum below the throttle plate or blade (not shown) sometimes called the butterfly valve, causing gases in crankcase 20 to flow through the positive crankcase ventilation (PVC) valve 18 and conduit 16 into the base 13 of carburetor 12. When as flow through the PCV valve 18 exceeds the quantity of gases forced past the piston rings (blow by) into the crankcase 20, the balance of gases are delivered through the air cleaner 14 and conduit 24 to the crankcase 20, via the head cover 22. In cases where the air entering conduit 24 is not filtered, conduit 24 is moved to a different location on air cleaner 14, to provide for air intake on the filtered side of the air cleaner cartridge.

The second step in the method of the invention is to increase the flow through the PCV valve 18 so that increased air from the air cleaner 14 is supplied through the crankcase 20 under the throttle plate of the carburetor 12. This dilutes (leans out) the mixture of fuel and air metered into the engine by the carburetor 12 thereby decreasing the ratio of fuel to air. By lowering the fuel-to-air ratio, a more complete combustion of the fuel results which in turn reduces the carbon monoxide and unburned hydrocarbon emission and as a side benefit also lowers fuel consumption for a given load and speed.

The flow rates of the PCV valve are modified to provide a particular range of air flow, depending upon the cubic inch displacement of the particular internal combustion engine. These PCV flow rate characteristics are modified according to the cubic inch displacement in the following manner:

1. Engine displacements over 315 cubic inches: The PCV valve is modified and installed to provide 1.5 to 2.5 standard cubic feet per minute when the vacuum under the carburetor throttle blade is 12 to 14 inches of mercury or higher and 7 to 8 standard cubic feet per minute when the vacuum under the carburetor throttle blade is approximately 4 to 5 inches of mercury vacuum.
2. Engine displacements between 175 and 315 cubic inches: The PCV valve flow is modified and set to 1.0 and 2.0 standard cubic feet per minute when the vacuum under the carburetor throttle plate is 11 to 13 inches of mercury or higher and to a maximum of approximately 7 to 8 standard cubic feet per minute at 4 to 5 inches of mercury vacuum under the carburetor plate.
3. Engine displacements smaller than 175 cubic inches: The PCV valve is modified and set to produce a flow of 0.8 to 1.5 standard cubic feet per minute when the vacuum under the carburetor plate is 10 to 12 inches of mercury or higher and a maximum flow of 5 to 6 standard cubic feet per minute at four to five inches of mercury vacuum under the carburetor plate.

Figure 2:
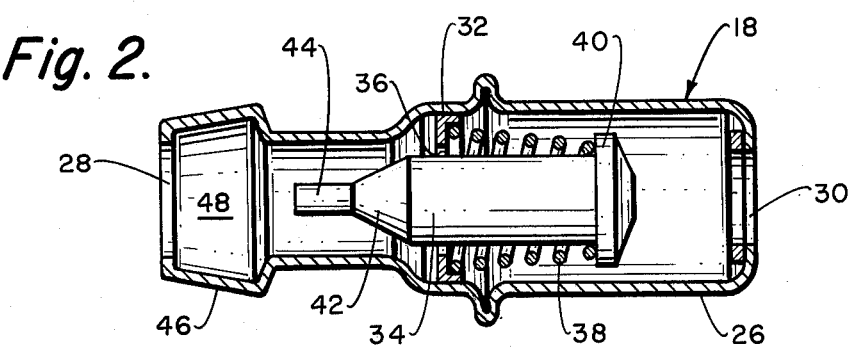
FIG. 2 is a sectional side view of a positive crankcase ventilation valve for use with the method of the invention.
Figure 3:
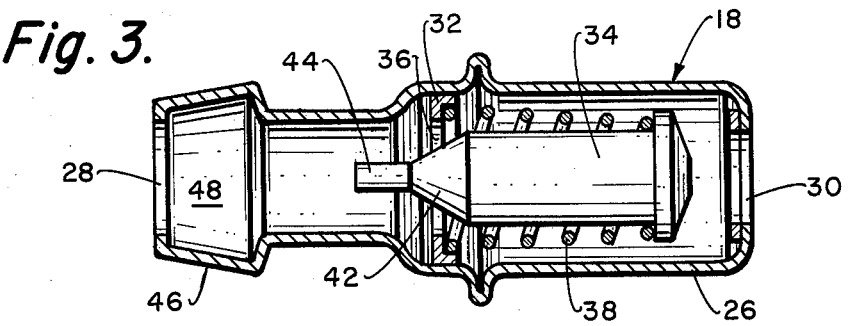
FIG. 3 is another sectional side view of the positive crankcase ventilation valve for use with the method of the invention.

The particular flows for the engine displacements described above are obtained by modifying the standard PCV valves as illustrated in FIGS. 2 and 3. The PCV valve is constructed with a casing 26 having an opening at either end 28 and 30. Flow through the housing 26 is controlled by an annulus 32 and a pintle 34 biased in and out of an aperture 36 by a spring 38. The spring 38 engages a shoulder 40 on the head of the pintle 34. Rapid and controlled increase in flow through the PCV valve is provided by a conical taper 42 on the pintle 34 which terminates in a small cylindrical tip 44.

As shown in FIG. 3, a decrease in vacuum allows the pintle 34 to be biased to the right by spring 38 until the conical section 42 is circumjacent the aperture 36 in the annulus 32. As the pintle 34 continues to move to the right, the space between the pintle and the aperture 36 rapidly increases, thus increasing the flow through the PCV valve to the carburetor 12. Maximum flow is controlled by the narrow cylindrical tip 44 by preventing the distance between the pintle 34 and the aperture 36 from increasing beyond a predetermined amount.

Figure 4:
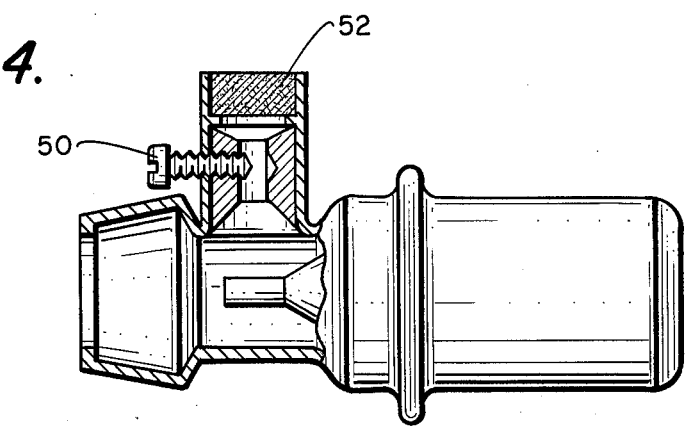
FIG. 4 is a partially sectioned side view of an adjustable positive crankcase ventilation valve.

FIG. 4 shows a view of an adjustable PCV valve. This provides for the adjustment of the air flow during the idling condition of the engine. This minimizes the number of valves required for different engine sizes and also provides a means of further optimizing the fuel air mixture for a particular engine. The geometry of the modulating part is similar to that shown in FIGS. 1 and 2. In the idle position shown in FIG. 2 the geometry is selected to give a low flow rate acceptable for small displacement engines when the air adjustment screw 50 is closed. When screw 50 is completely open the idle flow rate is acceptable for larger displacement engines.

In conjunction with the increased flow permitted through the PCV valve 18, the inside diameter of conduit 16 must be increased to accommodate the increased flow. Generally an inside diameter for the conduit 16, of one-half inch is sufficient to accommodate the maximum increased flow.

The increased flow is illustrated by the positions of the pintle 34 in the PCV valve shown in FIGS. 2 and 3. Then the neck 46 connects the chamber 48 to the carburetor 12 through the conduit 16. At higher carburetor vacuum, the pintle or plunger 42 is drawn into the aperture 36 in the annulus 32. This reduces space between the pintle 34 and the aperture 36 in the annulus or control ring 32, providing a reduced air flow through the PCV valve 18 in accordance with the amount specified above. The biasing force of the spring 38 is also set to control the distance the pintle or plunger 34 is drawn into the aperture 36 in the control ring 32. The position of the pintle 34 shown in FIG. 2 occurs when the engine is idling, decelerating, or under a very light, steady-state load condition.

The operation illustrated in FIG. 2 represents the position of the pintle or plunger 34 when the engine is accelerating and is under heavy steady-state load condition. The vacuum in chamber 48 is now low and the spring force from the spring 38 overcomes the plunger force providing a larger flow through the aperture 36, by the increased space between the control plate 32 and the pintle 34. This results in a greater flow into the carburetor 12, even though the vacuum below the throttle plate is lower. The operation of the engine 10 at conditions between those represented by the FIGS. 2 and 3 produces PCV valve flow rates that vary depending upon the vacuum value in accordance with the flow rates specified for the vacuums and cubic inch displacements described above.

The third step of the method of the invention involves a particular adjustment of the idle mixture and speed (RPMs) screws of the carburetor 12. This step involves turning the external idle mixture screws and idle speed normally provided on all carburetors. In cases where they provide limiter caps on the idle mixture screws, they must first be removed.

The adjustments are then made as follows:

1. Adjust mixture screws about two turns (720°) richer than the recommended factory adjustment for sea level conditions. This normally means a counter-clockwise rotation.

2. Adjust engine idle speed to 20 RPM (revolutions per minute) faster than manufacturer's recommended specification, if the specification is listed with the transmission in "drive". If the specification is listed with the transmission in "neutral" position, adjust engine speed to 30 RPM faster than manufactuer's recommended specification.

3. Adjust the idle mixture screws toward the lean condition until the engine speed RPM drops to the manfuacturer's specifications.

The first Step 1 above is to make sure the carburetor is richer than the lean-best-idle condition when adjustment of the idle speeds are made. The final adjustment Step 3 involves adjusting a single idle mixture screw for single-barrel carburetors, but involves adjusting two idle mixture screws for two or four-barrel carburetors. For either two or four-barrel carburetors with two screws, it is simply a matter of adjusting one mixture screw toward the lean condition until the engine speed drops halfway to the manufacturer's specified speed level, then adjusting the other idle mixture screw in the lean direction until the engine drops the other half to be level with the manufacturer's specified RPM. In the event that the engine is idling slightly rough, indicating a possible lean misfire, the mixture screws are adjusted in the normal fashion by one-eighth of a turn (45°) increments until the roughness is eliminated. On two or four-barrel carburetors, it is necessary to turn each screw the same amount to maintain a balanced condition in the carburetor.

This special carburetor idle adjustment produces an optimum fuel-air ratio for minimum emissions and fuel consumption when the engine is under idle, deceleration and very light steady-state load conditions and the PCV valve plunger is in the position shown in FIG. 2 created by high vacuums.

These three modifications and adjustments are a unique combination which produces extraordinary high altitude benefits in reduced fuel consumption and exhaust emissions at low cost for modification hardware and labor.

Tests have been performed on a number of vehicles modified by the method of this invention, according to Federal government specifications. The results were based upon Federal emission test cycles which were designed to simulate stopping or driving conditions in a typical metropolitan area of a large city. The results of the tests substantiated earlier tests on the inventive method which gave approximately a 48% reduction in carbon monoxide, a 28% reduction in unburned hydrocarbons, and 12% reduction in fuel consumption on six vehicles of model years ranging from 1966 through 1972. The tests for a number of vehicles showed carbon monoxide reductions of from 38% to 57%, a reduction in unburned hydrocarbons of from 3% to 40% and a fuel consumption reduction of from 10% to 13%. Thus the method of this invention results in improvements beyond those which would normally be expected by a simple and low-cost method involving a special recalibration and coordination of carburetion and spark timing of the engine. This recalibration and adjustment provides unexpected and extraordinary reductions in exhaust emissions and fuel consumption under high altitude operating conditions.

Obviously many modifications and variations of the present invention are possible in light of the above teachings. It is therefore to be understood that the full scope of the invention is not limited to the details disclosed herein but may be practiced otherwise than as specifically described.

What is claimed is:

1. A method of improving exhaust emissions and fuel economy for an engine operating at predetermined altitudes and comprising:
   advancing the spark between one and one-half engine crankshaft degrees for each thousand feet of elevation above sea level;
   controlling the flow volume of gas vented from the crankcase of the engine to the carburetor to a flow volume of between 0.8 and 2.5 standard cubic feet per minute at vacuum levels of 10 to 14 inches of mercury and increasing to 5 to 8 cubic feet per minute at 4 or 5 inches of mercury according to the cubic inch displacement of said engine;
   adjusting the carburetor idle mixture screw to approximately a lean - best - condition; and
   adjust said engine idle speed screw to adjust the engine speed to a predetermined setting.

2. The method according to claim 1 wherein the flow of gases is controlled to be between 1.5 to 2.5 standard cubic feet per minute at a vacuum level of from 12 to 14 inches of mercury and increasing to 7 to 8 cubic feet per minute at 4 to 5 inches of mercury in an engine having a displacement greater than 315 cubic inches.

3. The method according to claim 1 wherein the flow of gases is controlled to be between 1.0 to 2.0 standard cubic feet per minute at a vacuum level of from 11 to 13 inches of mercury and increasing to 7 to 8 cubic feet per minute at 4 to 5 inches of mercury in an engine having a displacement of 175 to 315 cubic inches.

4. The method according to claim 1 wherein the flow of gases is controlled to be between 0.8 to 1.5 standard cubic feet per minute at a vacuum level of from 10 to 12 inches of mercury and increasing to 5 to 6 cubic feet per minute at 4 to 5 inches of mercury in an engine having a displacement of less than 175 cubic inches.

5. The method according to claim 1 wherein the engine idle speed is adjusted to 20 rpm faster than manufacturer's specification determined with the transmission in drive.

6. The method according to claim 1 wherein the engine idle speed is adjusted to approximately 30 rpm faster than manufacturer's specification determined with the transmission in neutral position.

7. The method according to claim 1 wherein said controlling of the volume of gases in existing engines having PCV valves comprises:
   replacing the PCV valve to increae the flow volume a predetermined amount; and
   increasing the size of conduit from the PCV valve to the carburetor.

8. The method according to claim 7 wherein said PCV valve replacements includes:
   adjustable means for adjusting the flow volume.

* * * * *